United States Patent
Chatani et al.

(10) Patent No.: US 7,363,384 B2
(45) Date of Patent: Apr. 22, 2008

(54) SELECTION OF CONTENT IN RESPONSE TO COMMUNICATION ENVIRONMENT

(75) Inventors: Masayuki Chatani, Foster City, CA (US); Sachiko Inoue, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 750 days.

(21) Appl. No.: 09/903,308

(22) Filed: Jul. 11, 2001

(65) Prior Publication Data

US 2003/0018767 A1    Jan. 23, 2003

(51) Int. Cl.
    *G06F 15/16* (2006.01)
(52) U.S. Cl. ............ 709/232; 709/203; 709/226; 709/229
(58) Field of Classification Search ........ 709/217–219, 709/223–226, 201, 203, 229, 232
    See application file for complete search history.

(56) References Cited

U.S. PATENT DOCUMENTS

| | | | | |
|---|---|---|---|---|
| 5,740,075 A * | 4/1998 | Bigham et al. | ............ | 709/229 |
| 5,841,870 A | 11/1998 | Fieres et al. | ................. | 380/25 |
| 5,953,506 A * | 9/1999 | Kalra et al. | ................. | 709/231 |
| 6,012,088 A | 1/2000 | Li et al. | ...................... | 709/219 |
| 6,061,722 A * | 5/2000 | Lipa et al. | ................. | 709/224 |
| 6,134,584 A | 10/2000 | Chang et al. | ............... | 709/219 |
| 6,411,697 B1 | 6/2002 | Creamer et al. | ....... | 379/201.12 |
| 6,594,699 B1 * | 7/2003 | Sahai et al. | ................. | 709/228 |
| 6,651,103 B1 * | 11/2003 | Markowitz et al. | ......... | 709/228 |
| 6,654,783 B1 * | 11/2003 | Hubbard | .................... | 709/226 |
| 6,829,633 B2 * | 12/2004 | Gelfer et al. | ............... | 709/228 |
| 7,120,926 B1 * | 10/2006 | Safadi et al. | ............... | 725/132 |
| 2003/0045275 A1 * | 3/2003 | McDonagh et al. | ........ | 455/414 |
| 2003/0189913 A1 | 10/2003 | Kim | | |

FOREIGN PATENT DOCUMENTS

| | | |
|---|---|---|
| JP | 11-149448 | 6/1999 |
| KR | 2000-0058858 | 10/2000 |
| WO | 0203732 A1 | 10/2002 |

OTHER PUBLICATIONS

Patent Cooperation Treaty, "International Search Report," dated Oct. 3, 2002, for corresponding application No. PCT/US02/22345, 5 pages.

K. Ham et al., "Wireless-adaptation of WWW Content over CDMA", IEEE, 1999, pp. 368-372.

(Continued)

*Primary Examiner*—Phuoc Nguyen
(74) *Attorney, Agent, or Firm*—Fitch, Even, Tabin & Flannery

(57) ABSTRACT

A content transfer service manager node of a computer network manages the transfer of content over the network from a content provider node to a user node. The characteristics of the configuration of the user node are determined, including the user nodes capabilities with respect to downloading content and processing downloaded content. The service manager arranges a content transfer that is particularly suited for the hardware, software, and communication capabilities of the user node.

79 Claims, 11 Drawing Sheets

OTHER PUBLICATIONS

B. Kreller et al., "UMTS: A Middleware Architecture and Mobile API Approach", IEEE Personal Communications, Apr. 1998, pp. 32-38.

E. Kovacs et al., "Adaptive Mobile Access to Context-aware Services", IEEE, 1999, pp. 190-201.

European Search Report for European Patent Application No. 02752326.5.

Chinese Patent Office, "Notification of the First Office Action" for corresponding Chinese application No. 02802729.9; Dec. 16, 2005; 15 pages, including English translation.

Japanese Patent Office; "Official Action (Preliminary Notice of Rejection)" for corresponding Japanese application No. 2003-512864; dated Oct. 3, 2006; 5 pages, including English translation.

Korean Patent Office; "Notice of Preliminary Rejection" for corresponding Korean application No. 10-2003-7010263; Jul. 26, 2005; 3 pages including English translation.

European Patent Office; Examination Report for the corresponding European application No. 02 752 326.5-2211; Sep. 17, 2004; 4 pages.

* cited by examiner

SELECTION OF CONTENT IN RESPONSE TO COMMUNICATION ENVIRONMENT

BACKGROUND OF THE INVENTION

1. Field of the Invention

This invention relates generally to downloading of content over a computer network and, more particularly, to a system for selecting and downloading content according to the capabilities of a downloading device.

2. Description of the Related Art

The Internet is a world-wide collection of interlinked computer networks that is used to store and transfer documents and other electronic files on a global basis. In the early days of what is now known as the Internet, users ran a special program using a protocol called FTP (file transfer protocol) to access and transfer files. Efficient use of FTP programs required a level of technical skill beyond that of the general population, but early users were generally somewhat skilled. Furthermore, the types of files available over the Internet consisted largely of technical documents that were of little interest to the average person. Even if interesting content was available over the Internet, the general public did not have access to the computer hardware necessary to log on to the Internet. Consequently, the majority of Internet users were technical-savvy scientists who had access to Internet-capable computers and who were comfortable using protocols such as FTP.

The emergence of the World Wide Web (the "Web") resulted in a dramatic increase in the general public's interest in the Internet. The Web is a collection of millions of linked documents that reside on computers throughout the world and that are accessible via the Internet. The documents are typically in the form of Web pages, which combine text, graphics, audio, and colors, thereby resulting in an attractive visual appearance and entertaining multimedia experience. Furthermore, unlike the early Internet documents that were navigated using FTP, Web pages are navigated by simply clicking on hyperlinks that are displayed on the user's computer screen in a robust program. The browser downloads Web pages, including all page elements, from a Web server to the user's computer. Moreover, Internet-capable hardware has decreased in cost and increased in availability, thereby increasing the general public's ability to access to the Internet.

The type of content and services that are available over the Internet has also grown. Internet users can now download Web pages that go beyond a simple combination of text and graphics. Modern Web pages can include animation, video, sound, and high-definition graphics. Users can use the Internet to download music files, video files, video games, and files in formats for various other applications. There are also various technologies now available to users for downloading content over the Internet, including video and audio streaming and push and pull technologies. Users are also accessing the Internet for various services, such as banking and shopping. The "old" Internet world where scientists used FTP to retrieve technical documents has now transformed into a "new" Internet world where millions of users access a myriad of content and services using any of a wide variety of transport technologies.

Adding to the diversity of Internet use are the wide differences in Internet-ready hardware. In the past, most users accessed the Internet using desktop and laptop computers. Users can now access the Internet using mobile phones, personal digital assistants, and Web appliances. It is envisioned that the type of devices used to access the Internet will expand to VCR's, automobiles, and even household appliances. Such Internet-capable devices have varying levels of hardware capabilities, such as storable memory space, processing speed, accessible memory, and graphics capabilities. The result is that Internet-ready devices are now as diverse as the users that access the Internet and the type of content that is available over the Internet.

The communication technologies that are used to gain access to the Internet also vary widely. In the past, most users accessed the Internet using a modem that interacted with the switched public telephone network (PSTN). Users can now access the Internet using high-speed broadband connections, such as cable television lines and digital subscriber lines (DSL), which provide higher bandwidth and increased access speed over traditional telephone-line modems. Wireless access is also growing in popularity and use. Consequently, the access speeds and bandwidth capabilities can vary widely for each Internet user.

The bottom line is that the Internet is filled with diversity, from the types of available content to the types of hardware and communication technologies that can be used to access the Internet. This makes it difficult for Internet content providers to tailor their content to the hardware and communications capabilities of Internet users. As a result, some Internet content providers only provide content that is directed toward the lowest common denominator so that virtually any Internet user can access the content. For example, a content provider could provide Web pages that do not require high-bandwidth connections or computers with advanced processors. However, such rudimentary content does not provide a satisfactory Web experience and can deter high-end users from accessing the site. On the other hand, some content providers offer only cutting-edge content, such as video and audio streaming that requires high bandwidth and fast processors. Unfortunately, such content providers could miss out on an entire segment of users that do not have such capabilities.

One solution to this problem is for a Web site to provide the ability to manually select the level of content and service that will be made available from the site. For example, if the user is downloading a movie trailer from a Web site, the site may provide a menu that allows the user to specify whether the computer has high-bandwidth or low bandwidth capabilities and thereafter choose the type of content to download. Other Web sites allow the user to choose between Web pages with animation or Web pages without animation. Unfortunately, this requires the user to have knowledge of the hardware and communication capabilities of the computer. This may deter inexperienced users or cause a user to select the wrong capabilities, which may result in a poor Internet experience for the user.

In light of the foregoing, it would be highly desirable for both Internet content providers and Internet users to have a way of optimizing Internet content and service levels to the user's hardware and communications capabilities without requiring user expertise or intervention. The present invention provides this capability.

SUMMARY OF THE INVENTION

In accordance with one aspect of the invention, a content transfer service manager node of a computer network manages the transfer of content over the network from a content provider node to a user node. The characteristics of the user node are determined, including the user node's capabilities with respect to downloading content and processing downloaded content. The service manager then arranges a content transfer that is particularly suited for the hardware, software, and communication capabilities of the user node.

In one aspect of the invention, the transfer of content to a user device is managed. The user device is communicatively linked to a computer network. A service manager obtains user device information descriptive of a configuration of the user device and receives a request to transfer content to the user device over the computer network. The service manager determines capabilities of the user device to download content over the network and to process content received over the network based upon the user device information. Based upon the determined capabilities of the user device, the service manager automatically selects a service level that is available to the user device for transferring content to the user device. A service level is associated with one or more characteristics of content for transfer to the user device and is further associated with one or more characteristics of the manner in which content is transferred to the user device over the network.

Other features and advantages of the present invention should be apparent from the following description of the preferred embodiment, which illustrates, by way of example, the principles of the invention.

DETAILED DESCRIPTION

Figure 1:
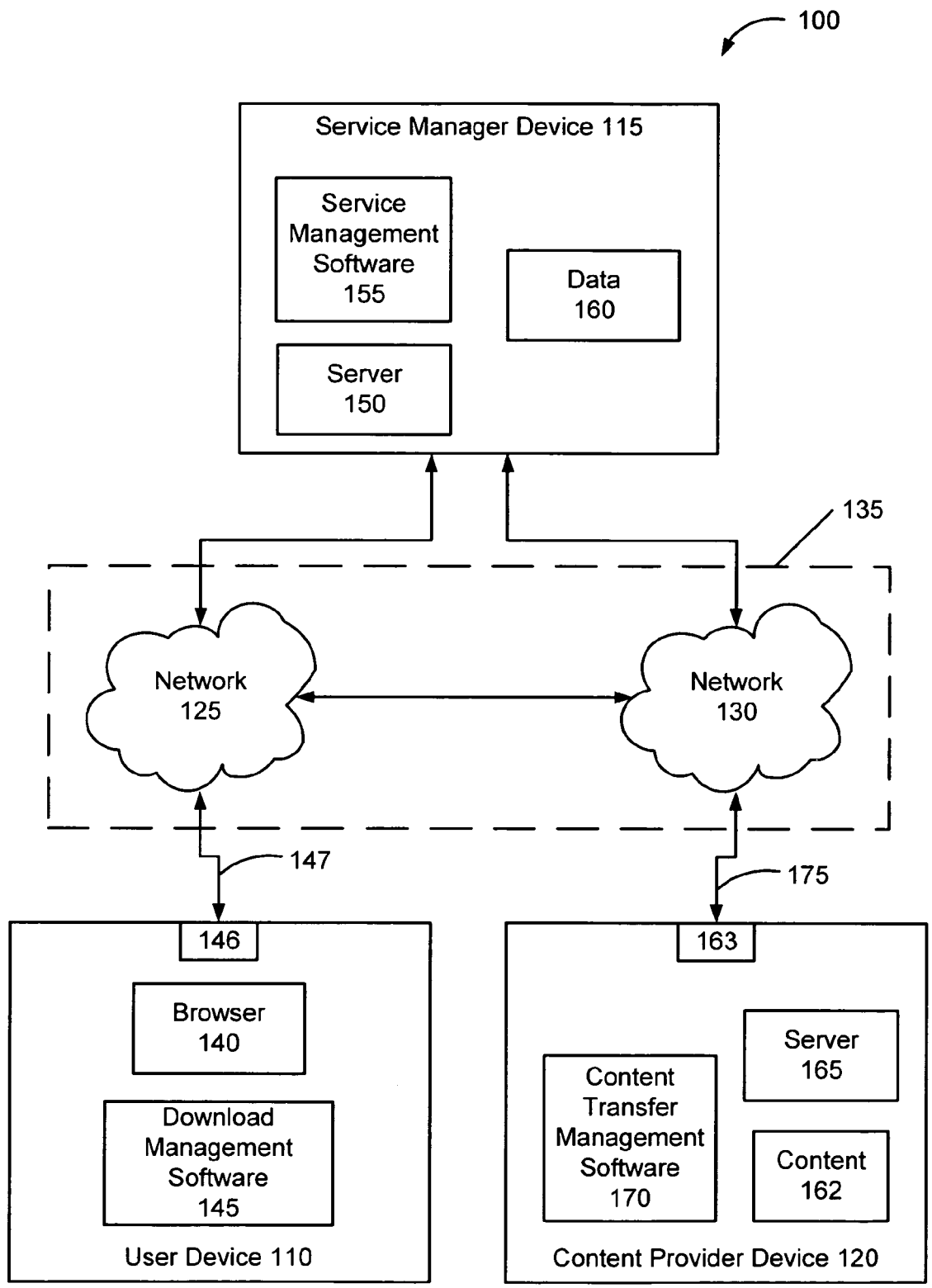
FIG. 1 is a block diagram of a computer network that operates in accordance with the present invention, showing a user node, a service management node, and a content provider node.

FIG. 1 illustrates a block diagram of a network system 100 that includes several computer nodes, including at least one user device 110, a service manager device 115 and at least one content provider device 120, which are all interlinked via one or more computer networks. The network system 100 enables the user device 110 to obtain electronic content from the content provider device 120, with the service manager device 115 acting as an intermediary that optimizes the transfer of content between the two, as described in more detail below. The service manager device 115 preferably interfaces with both the user device 110 and the content provider device 120 and manages a content transfer between them that is particularly suited for the capabilities of each device. FIG. 1 shows only a single user device 110 and a single content provider device 120, although the service manager device 115 can manage content transfers between multiple user devices and content provider devices.

As used herein, the term "content" refers to any type of electronic data that may be transferred over a computer network, including, for example, software executable files (such as computer games) and other electronic data files, such as Web pages, text files, audio files, and video files.

As shown in FIG. 1, a computer network 125 communicatively links the user device 110 to the service manager device 115. A computer network 130 communicatively links the content provider device 120 to the service manager device 115. Both of the networks 125 and 130 may comprise a single computer network 135, such as the Internet, as exhibited by a dashed box in FIG. 1 that encompasses the networks 125 and 130. For convenience, the network system 100 is described herein in the context of the single network 135. As used herein, the term "Internet" refers to a collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

The user device 110 comprises any type of device that is configured to interact with and download content from the network 135. For example, the user device 110 may comprise a desktop computer, a laptop computer, a mobile phone, or a personal digital assistant. The user device 110 can also comprise a computer entertainment system that is suited for playing computer video games and also communicating with the computer network. The user device 110 includes a network interface 146 that enables communication over a communication link 147 between the network 135 and the user device 110. The link 147 could be wired or wireless.

A browser 140 preferably resides in the memory of the user device 100. The browser 140 is a software application that is used to locate and display content from the network 130, such as World Wide Web pages. The user device 110 further includes in memory a download management software application 145 that configures and manages the downloading of content from the network 135, as described in detail below. The download management software 145 is preferably configured to detect data relating to the communication and hardware capabilities of the user device 110 and to interact with corresponding service management software in the service manager device 115.

With reference still to FIG. 1, the service manager device 115 comprises a computer system that is configured to communicate over the network 135, such as using the standard protocols of the World Wide Web. As mentioned, the service manager device 115 functions as an intermediary between the user device 110 and the content provider device 120 regarding the transfer of content therebetween over the network 135. In other words, the service manager device 115 functions as a centralized content clearing house through which a user can review, select, and download content that is available over the network 135.

Figure 2:
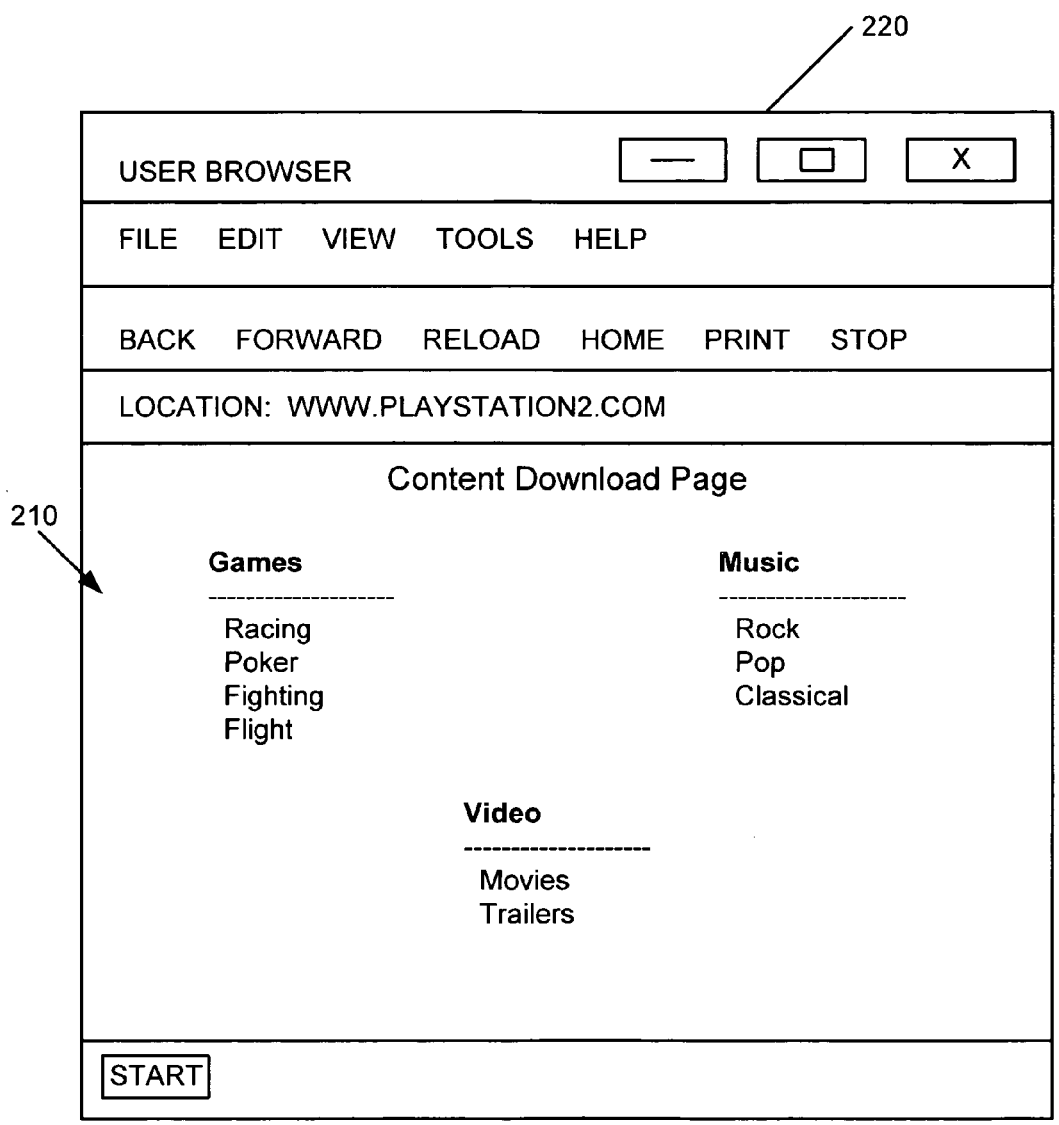
FIG. 2 is an illustration of a display screen produced at a client node of the computer network, showing a Web page for perusing, selecting, and downloading content from the content provider node.

In accordance with these functions, the service manager device 115 preferably administers a Web site through which a user can access and download content from the network 135. The service manager device 115 includes a server 150 that maintains and serves one or more Web pages that can be accessed via the user device 110. The server 150 may comprise a server application that executes in memory of the service manager device 115, or may comprise a separate computer component of the service manager device. FIG. 2 shows an exemplary content download Web page 210 within a browser window 220 that is displayed on a display screen of the user device 110. The Web page 210 preferably includes a user interface that presents a listing of content that the user may access, such as by clicking on an appropriate hyperlink or selecting from a menu. For example, the Web page 210 may include a listing of computer game applications that the user can download or a listing of music files or video files that the user can download.

With reference again to FIG. 1, the service manager device 115 includes in memory a service management software application 155 that causes the service manager device 115 to manage content transfers between the content provider device 120 and the user device 110. Content transfers are managed in that the content manager device 110 obtains information regarding the user device 110 and/or the content provider device 120 and, based upon the information, determines parameters that may govern the content transfer. The service manager device 115 then causes a content transfer to occur, as described in more detail below.

The service management software 155 preferably maintains in a data store 160 a list of content that is available over the network 135 via the service manager device 115. The service management software 155 also maintains the network location of each item of content, such as a uniform resource locator (URL) for content. For example, the service management software 155 could maintain a listing of content that is available from the content provider device 120, as well as the URLs associated with such content. It is appreciated that the service management software 155 could maintain a listing of content available from a plurality of content provider devices.

Referring to FIG. 1, the content provider device 120 comprises any source of content 162 available to the user device 110 via the network 135. The content provider device 120 has access to content 162 that is stored in a local data store or in a data store that is available to the content provider device 120. The content provider device 120 device includes a network interface 163 that enables communication over a communication link 175 between the network 135 and the content provider device 120. The content provider device 120 further includes a server 165 that serves the content 162. It is appreciated that the content provider device 120 and the service manager device 115 could be combined into a single computer or system of computers.

The content provider device 120 preferably includes in memory a content transfer management software application 170 that manages the transfer of content to the user device 110. The content transfer management software 170 communicates with the service management software 155 and provides information to the service management software 155 relating to content that is available from the content provider device 120. The service management software 155 preferably provides information regarding the URL of the content, the type of content, such as whether the content comprises a Web page, a video file, or an audio file, the size of the content, and the transfer modes available for the content, such as whether the content can be transmitted in a streaming fashion.

Figure 3:
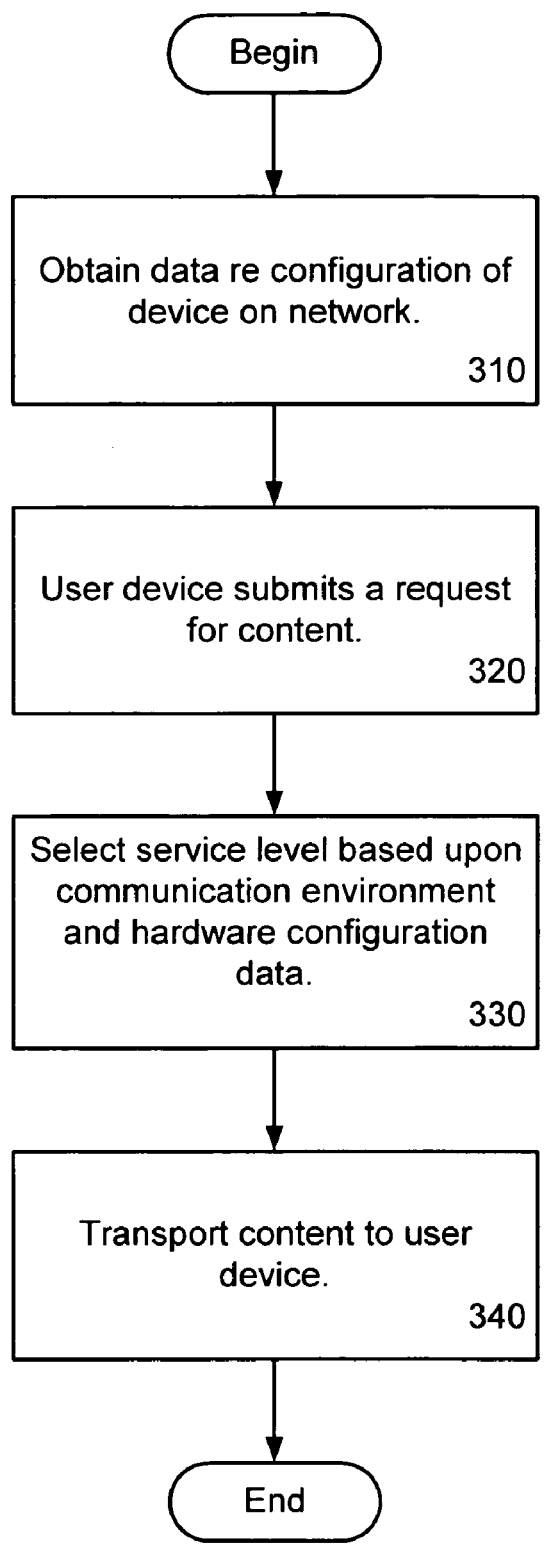
FIG. 3 is a flow diagram that illustrates the operations performed in configuring and managing the download of content from the content provider node.

FIG. 3 is a flow diagram that illustrates the general operations performed by the network system 100 in transferring content between the content provider device 120 and the user device 110. The process is described in the context of a content transfer from the content provider device 120 to the user device 110, although the process could also apply to a content transfer or a communication from the user device 110 to the content provider device 120. In the first operation, indicated by the flow diagram box numbered 310, the service manager device 115 obtains data relating to the configuration of the user device 110 and/or the content provider device 120 on the network 135, including the communication environment and hardware configuration of the device.

The communication environment includes any factors that affect the speed and manner by which a device uploads and download content to and from the computer network 135. The term "communication environment data" includes any data that is descriptive of the communication environment. The communication environment data for the user device 110 could include, for example, the bandwidth of the user device network interface 146, as well as the bandwidth of the link 147 between the user device 110 and the network 135. The communication environment data could also include data that describes the link 147, such as whether the link is, for example, a digital subscriber line (DSL), a cable modem line, an integrated services digital network (ISDN) line, or a dial-up line. The communication environment data could also include data related to the latency of the user device 110 with respect to both the service manager device 115 and the content provider device 120. The latency is the time difference between when the user device 110 issues a request for content and when the user device 110 receives the content.

The hardware configuration describes the arrangement of hardware for a device linked to the computer network. The term "hardware configuration data" includes any data descriptive of the hardware configuration for a given device. The hardware configuration of the user device 110 includes, for example, the type of processor, the processor speed, whether data storage such as a hard disk is available, whether the storage is local, the access speed of the hard disk, and the data storage capacity. The hardware configuration data could also include the amount of memory available to user device 110 and the types of video cards and sound cards, if any, that are present in the user device 110. The process of determining the communication environment data and the hardware configuration data is described in more detail below with respect to FIG. 4.

It is appreciated that communication environment data and hardware configuration data could also be obtained in relation to the content provider device 120. In this manner, the service manager device 115 could maintain such data in relation to a plurality of user devices and content provider devices that are linked to the network 135, thereby providing central management of the data. A user or a content provider can then update the data by simply interfacing with the service manager device 120 and thereby provide access to the updated data to authorized parties that are linked to the service manager device 120.

In the next operation, represented by the flow diagram box numbered 320, the user device 110 submits a request for content to the service manager device 115. As mentioned, the user device 110 could submit the request by a user selecting a hyperlink on the Web page 210 (FIG. 2) that is served by the service manager device 115.

In the next operation, represented by the flow diagram box numbered 330, the service manager device 115 selects a service level for the transfer of content to the user device 110, the service level being based upon the previously-obtained communication environment data and hardware configuration data of the user device 110. The service level relates to the type of content that is transferred, as well as the manner in which the content is transferred. The service management software 155 preferably optimizes the service level for the particular communication environment and hardware configuration of the user device 110. This is described in more detail below with respect to the flow diagram of FIG. 5.

In the next operation, represented by the flow diagram box numbered 340, the service manager device 115 causes the requested content to be transmitted to the user device 110 over the network 135 according to the previously-selected service level. If the content is stored locally to the service manager device 115, then the server 150 simply serves the content to the user device 110. The service manager device 115 could also transmit a request to the content provider device 120 to transmit the requested content to the user device 110 according to the previously-selected service level. The process then ends.

Figure 4:
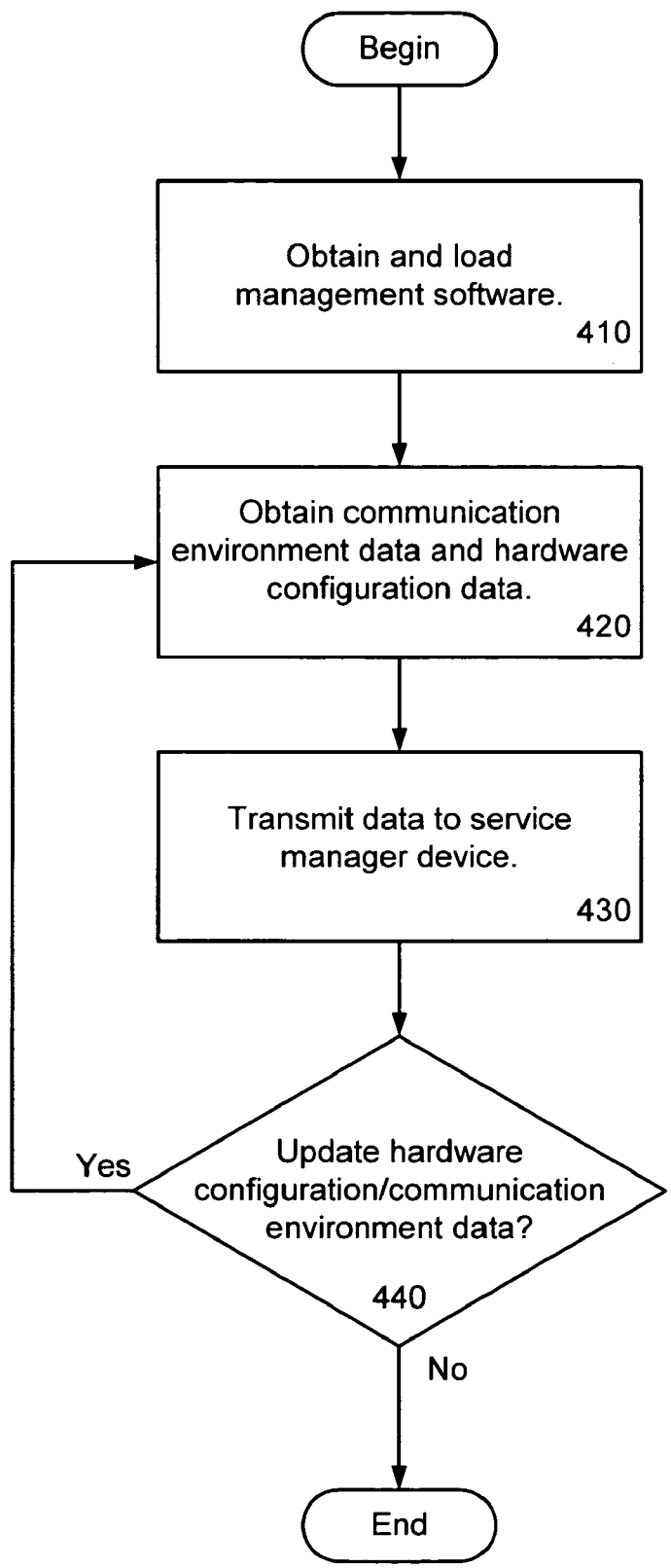
FIG. 4 is a flow diagram that illustrates the operations performed in obtaining data regarding the configuration of a device that is linked to the computer network.

FIG. 4 is a flow diagram that describes the operations performed in obtaining configuration data, such as communication environment data and the hardware configuration data, for a node of the computer network 135. The process is described in the context of obtaining such data in relation to the user device 110, although the data could also be obtained for the content provider device 120 or any other node of the computer network 135.

In the first operation, represented by the flow diagram box numbered 410, the user device 110 obtains the download management software 145 and loads the download management software 145 into memory. The user device 110 may obtain the download management software 145 by downloading the software from the service manager device 115. This could be accomplished, for example, by a user selecting a download hyperlink on the Web page 210 (FIG. 2). The download management software 145 can also be loaded onto the user device 110 using a removable storage medium, such as a floppy disk. The download management software 145 could also be pre-installed on a computer. Moreover, the download management software 145 could be periodically updated.

After the download management software 145 is loaded onto the user device 110, the download management software 145 proceeds to obtain communication environment data and hardware configuration data in relation to the user device 110. This operation is represented by the flow diagram box numbered 420. Preferably, the download management software 145 obtains the data automatically by causing the user device 110 to detect the data.

In relation to the communication environment data, the download management software 145 includes a performance testing module that, when executed, causes the user device to conduct one or more performance tests to obtain communication environment data for the user device 110. The performance testing module preferably executes upon installation of the download management software 145. The module could also execute at predetermined times, such as before or after a content transfer occurs to or from the user device 110.

The download management software 145 could obtain latency information by causing the user device 110 to "ping" the service manager device 115 and/or the content provider device 120. In this regard, the user device 110 may send an Internet Control Message Protocol echo request to a device on the network 135 and wait for a reply. The user device 110 calculates the length of time that it takes to receive the reply, which is an indication of the latency in relation to that device.

The download management software 145 also queries the network interface 146 to obtain bandwidth information for the network interface 146 and the link 147, including the bit rate, which is the amount the amount of data that can be sent over the network interface 146 and link 147 per unit time. The bit rate is typically measured in bits per second. The bit rate may be measured using well known methods.

The download management software 145 obtains hardware configuration data by accessing readily-accessible data files that are typically maintained by the operating system of the user device 110. For example, the "Windows" Operating System of Microsoft Corporation of Redmond, Washington, USA, maintains information relating to the hardware configuration of a device, such as the type of processor, processor speed, video and sound card information, and the peripheral devices, if any, that are attached to the device.

The download management software 145 may also obtain the communication environment data and the hardware configuration data by causing the user device 110 to display a user interface into which a user manually enters data. The user interface preferably include a series of questions regarding the hardware configuration and communication environment, as well as corresponding data entry fields that the user fills out in response to the questions. The download management software 145 can also obtain the communication environment and hardware configuration data through a combination of manual user entry and automatic detection.

In the next operation, represented by the flow diagram box numbered 430, the download management software 145 causes the user device 110 to transmit the configuration information, including the hardware configuration data and communication environment data, to the service manager device 115. The service manager device 115 preferably stores the data relating to the user device 110 in the data store 160. Preferably, the user device 110 also stores the data locally.

The user device 110 or the service manager device 115 preferably periodically determines whether to update the communication environment data and the hardware configuration data, as represented by the flow diagram decision box numbered 440. The data may be regularly updated on a fixed time interval, such as on a monthly basis or on a daily basis. The data may also be updated upon the occurrence of a specified event, such as when the user device 110 commences a download of content. The data may also be updated if the download management software 145 detects a change in the configuration of the user device 110, such as if the communication environment or the hardware configuration changes. If the criteria for updating the data is satisfied (a "Yes" outcome), then the process proceeds to the operations represented by the flow diagram boxes numbered 420 and 430, where the data is again obtained and reported. Otherwise, the process ends.

Figure 5:
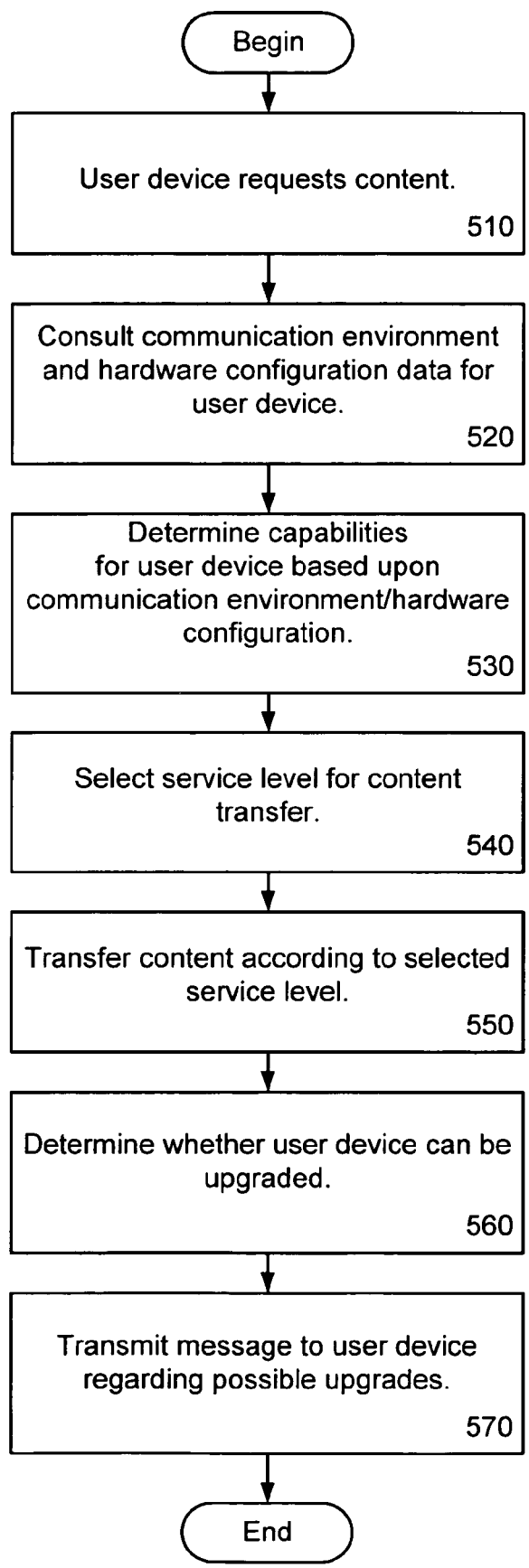
FIG. 5 is a flow diagram that illustrates the operations performed in transferring content from the content provider node to the user node according to the configuration of each node.

FIG. 5 is a flow diagram that shows the operations performed in transferring content from the content provider device 120 to the user device 110 over the network 135. In the first operation, represented by the flow diagram box numbered 510, the user device 110 submits a request for content. The user device preferably submits the request via a Web page administered by the service manager device 115. For example, a user could click on a link on such a Web page that displays a list of available content. The service manager device 115 receives the request from the user device 110.

In the next operation, represented by the flow diagram box numbered 520, the service manager device 115 accesses the configuration information, including the communication environment data and hardware configuration data relating to the user device 110. The service manager device 115 preferably maintains a record of communication environment data and hardware configuration data for each user device with which the service manager device 115 interfaces. The service manager device 115 may associate the user device 110 with the data by using a username and password combination.

In the next operation, represented by the flow diagram box numbered 530, the service manager device 115, using the service management software 155, determines the capabilities of the user device 110 based upon the communication environment data and hardware configuration data. The capabilities of the user device relate to the rate at which the user device can download data, the speed and processing capabilities of the processor in the user device 110, the amount of accessible and storable memory for the user device 110, and the access speed of any hard disks of the user device 110. The capabilities could also include other quantifiable factors that affect the user device's ability to download content over the network 135, as well as the user device's ability to process and output content, such as the processing of graphic, video, and sound information.

Furthermore, the user device capabilities could include other factors, such as whether the user device 110 can securely transmit and receive content according to a security protocol, such as the Secure Socket Layer (SSL) protocol or secure HTTP (S-HTTP).

In determining the capabilities of the user device 110, the service manager device 115 preferably determines the maximum bit rate at which the user device 110 can download content from the network 135. The service manager device 115 also determines whether the bit rate is sufficient to support an audio or video streaming transmission to the user device 110. For example, a minimum bit rate of 2 megabytes per second may be viewed as necessary to support streaming transmissions. The minimum bit rate may be modified as necessary. Furthermore, the service manager device 115 determines whether the processor of the user device 110 supports streaming transmissions.

After the service manager device 115 has determined the capabilities of the user device 110, it selects a service level to govern the transfer of the content to the user device 110. This operation is represented by the flow diagram box numbered 540. The selection of a service level is preferably based upon the capabilities of the user device 110. A given service level is associated with the characteristics of the content, such as the type and quality of content to be transferred, as well as the manner in which the content is transferred over the network. The type of content includes whether the content is a simple data file or whether the content is an executable application. The quality of the content relates to the data size of the content, whether the content includes graphics and audio files, as well as the resolution of such files. The manner in which the content is transferred includes, for example, whether the content is streamed to the user device. Content that is streamed is played automatically as the content is being transferred. Alternately, the content may be transferred in such a manner that the content is transferred to the user device 110 and not played until the entire file is transferred. The manner of transferring content could also include using (or not using) a secure protocol such as SSL. Thus, the service manager device 115 manages the data transfer between the user device 110 and the content provider device 120.

The service manager device 115 preferably offers various service levels that may be selected for downloading content from the content provider device 120. The operator of the content provider device 120 preferably determines the characteristics of each level and specifies to the service manager device 115 the characteristics of the service levels, as well as the minimum user device capabilities that are required in order to make a service level available to the user device 110. The service manager device 115 maintains a record of service levels that are available for a particular content provider and the associated minimum capabilities that are required. The available service levels may vary for each item of content.

For example, Table 1 shows that the service manager device 115 may maintain four service levels for a particular item of content that is available from the content provider device 120, as follows:

TABLE 1

| Required User Device Capabilities | Characteristics of Service Level |
|---|---|
| Analog modem (bit rate of 56 kbps or less), no hard disk, latency greater than 1 ms. | Only text files available. |
| Analog modem (bit rate of 56 kbps or less), hard disk present, latency less than 1 ms. | Text files available. Video game software applications available. |
| Cable modem or DSL line (bit rate of at least 2 Mbps), no hard disk, latency of less than 1 ms. | Text files available. Video game software applications available. Video streaming available. CD quality sound files available. |
| Cable modem (bit rate of at least 2 Mbps), hard disk present, latency of less than 1 ms. | Text files available. Video game software applications available. Video streaming available. CD quality sound files available. Higher resolution video streaming made available. |

The aforementioned listing of user device capabilities and corresponding available service levels are exemplary and could be modified according to the capabilities and preferences of the content provider. As the capabilities of the user device 110 increase, then the service manager device 115 preferably increases the service level that is made available to the user device 110.

Preferably, the service manager device 115 automatically selects the service level for the content transfer based upon whether the user device capabilities meet the minimum requirements for a service level. The service manager device 115 compares the user device capabilities with the requirements for each service level and selects the highest service level that is available. This advantageously provides a seamless transfer of content without requiring a user to manually select a service level. The service manager device 115 could also transmit information regarding the available levels to the user device 110 and then prompt the user device 110 to display the information. A user could then peruse the available service levels and select a desired service level using the user device 110.

It is appreciated that the service manager device 115 can make content available to the user device 110 after the user device capabilities are determined so that the user device does not actually select and request content until the service manager device determines the available service levels. In such a case, the operation shown in the flow diagram box 510 would occur after the operation shown in the flow diagram box 540.

After the service level has been selected, the service manager device 115 causes the content to be transferred to the user device 110 according to the selected level, as represented by the flow diagram box numbered 550. The service manager device 115 preferably transmits a notice to the content provider device 120, the notice containing information regarding the selected service level and the content to be transferred. The content transfer management software 170 receives the notice and causes the content provider device 120 to transmit the content to the user device 110 according to the selected service level. The content could also reside at the service manager device 115, in which case the service manager device 115 would simply transfer the content to the user device 110.

In the next operation, represented by the flow diagram box numbered 560, the service management software 155 determines whether the communication environment or the hardware configuration of the user device 110 could be modified so as to upgrade the capabilities of the user device 110 and thereby make additional service levels available to the user device 110. The service management software 155 preferably compares the communication environment and hardware configuration data with the minimum requirements for each service level and then determines what changes to the user device configuration would be necessary to make additional service levels available to the user device 110. The service management software 155 may maintain data that describes the factors that affect the capabilities of the user device 110.

For example, the service management software 155 may determine that the user device 110 meets all of the minimum requirements for a certain service level with the exception that the network interface of the user device 110 has insufficient bandwidth for the service level. The service manager device 115 then consults data, which specifies that the bandwidth could be increased by installing a DSL connection. The service management software 155 thereby determines that the user device 110 would achieve the required data transfer rate if equipped with a DSL line connection.

In the next operation, represented by the flow diagram box numbered 570, the service management software 155 causes the service manager device 115 to transmit a message to the download management software 145 of the user device 110. The message contains information related to changes that could be made to the user device in order to upgrade the available service levels. The information can include, for example, possible changes to the hardware configuration, the software configuration, and the communication environment of the user device 110.

Figure 6:
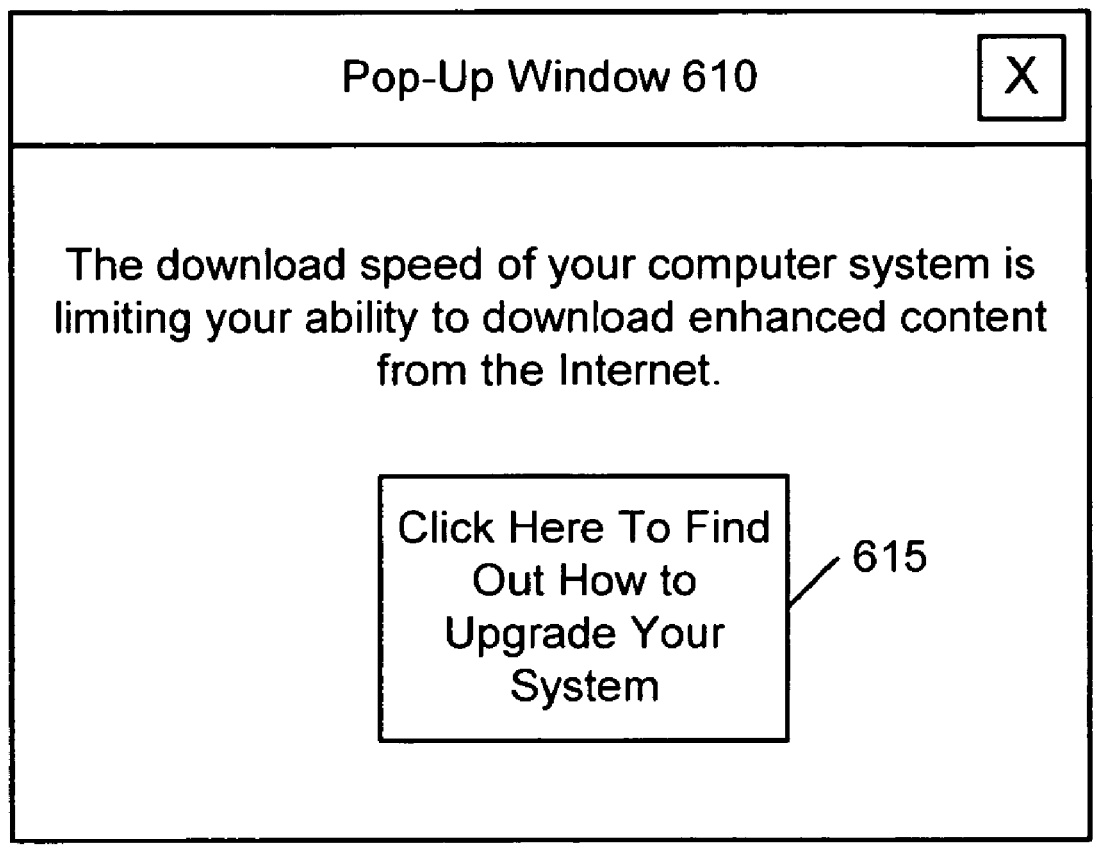
FIG. 6 is an illustration of a display screen produced at a client node of the computer network, showing a pop-up window that contains information regarding possible upgrades to a user node device.

In response to the message, the download management software 145 displays a notice that contains information relating to the possible changes. The notice can comprise a pop-up window, such as the pop-up window 610 shown in FIG. 6. The window 610 includes text that describes the deficiencies of the user device 110 in general terms. The window 610 also contains a link 615 that points to information regarding how changes to the user device 110 can be realized. The link 615 could point to Web sites of hardware providers or service providers that could assist in making the changes to the user device 110.

In one embodiment, the link 615 comprises an advertisement for such providers, or a link to such an advertisement. The download management software 145 preferably detects when the user selects any advertisement and then notifies the service management software 155 of such selection. The service management software 155 preferably maintains a running tab of such selections. An advertiser may compensate the operator of the service management device 115 for displaying advertisements, for users clicking on advertisements, or for displaying any information related to the advertiser. The operator of the service management device may receive monetary compensation or some other form of compensation from such advertisers.

Figure 7:
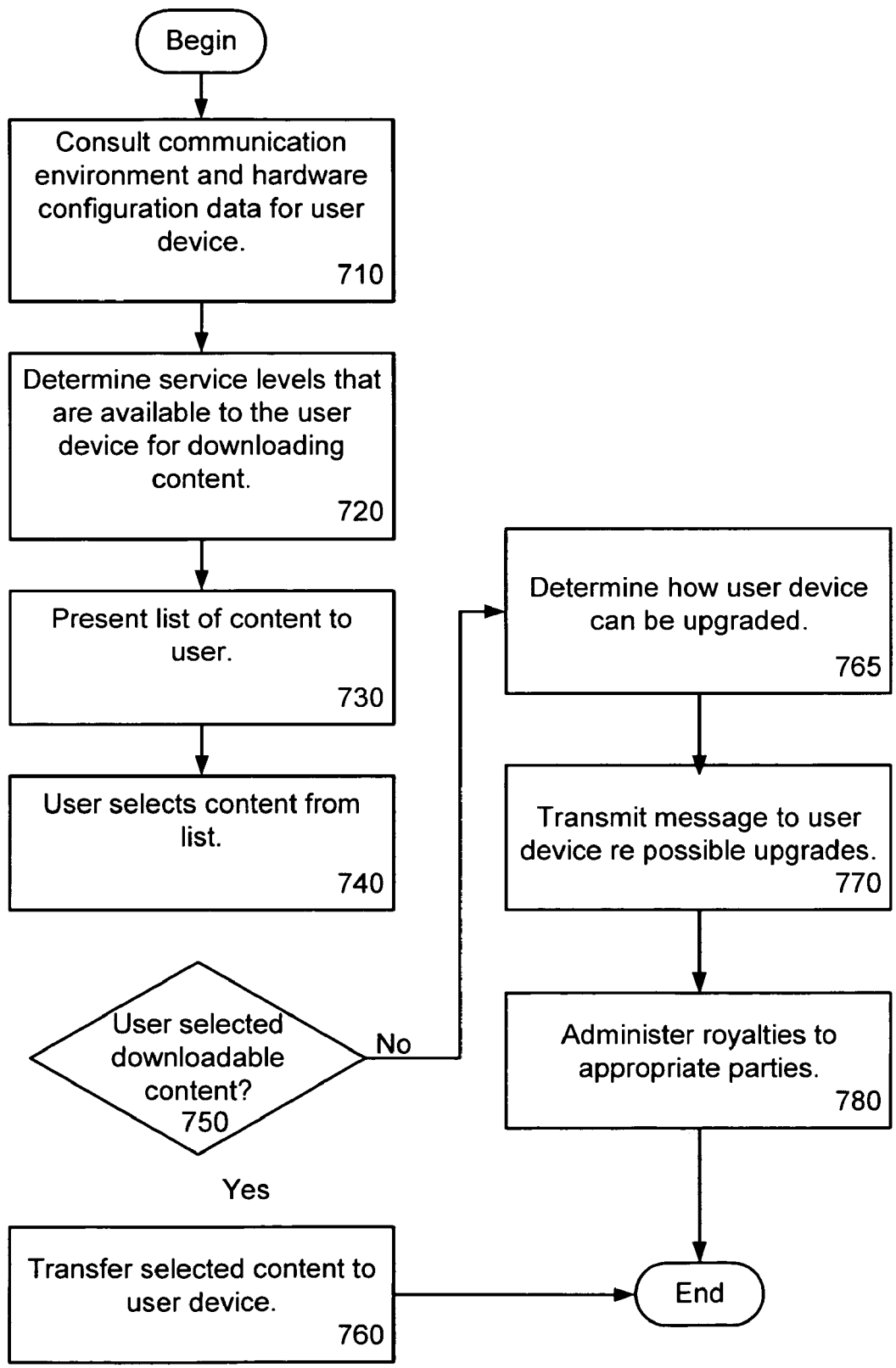
FIG. 7 is a flow diagram that illustrates the operations performed in another embodiment of transferring content from the content provider node to the user node according to the configuration of each node.

FIG. 7 is a flow diagram that shows the operations performed in another embodiment of the invention, where the capabilities of the user device are determined before the user selects content for downloading. In the first operation, represented by the flow diagram box numbered 710, the service manager device 115 accesses the configuration information, including the communication environment data and hardware configuration data relating to the user device 110. This operation can occur automatically when the user device 110 establishes a connection with the service manager device 115. The operation can also occur when the user device 110 establishes a connection with the network 135 or in response to the user device 110 initiating a download of content via the network 135.

In the next operation, represented by the flow diagram box numbered 720, the service manager device 115 determines the service level(s) that are available to the user device for downloading of content. The available service levels are determined based upon the capabilities of the user device, such as was described in the operations represented by the flow diagram boxes numbered 520 and 530 of FIG. 5.

In the next operation, represented by the flow diagram box numbered 730, the user is presented with a list of content that is available for a download request. The service manager device 115 preferably identifies a list of content that can actually be downloaded given the current capabilities of the user device 110. In this regard, the service manager device 115 can consult a table that maps downloadable content with the minimum service level necessary to download the content, such as Table 1, above. Based upon the available service levels, the service manager device 115 determines the corresponding content that is actually available to the user device 110 for download. The service manager device 115 preferably also identifies content that the user device 110 cannot download because the user device cannot attain the required service level. The user can be presented with a list of downloadable content as well as nondownloadable content.

Figure 8:
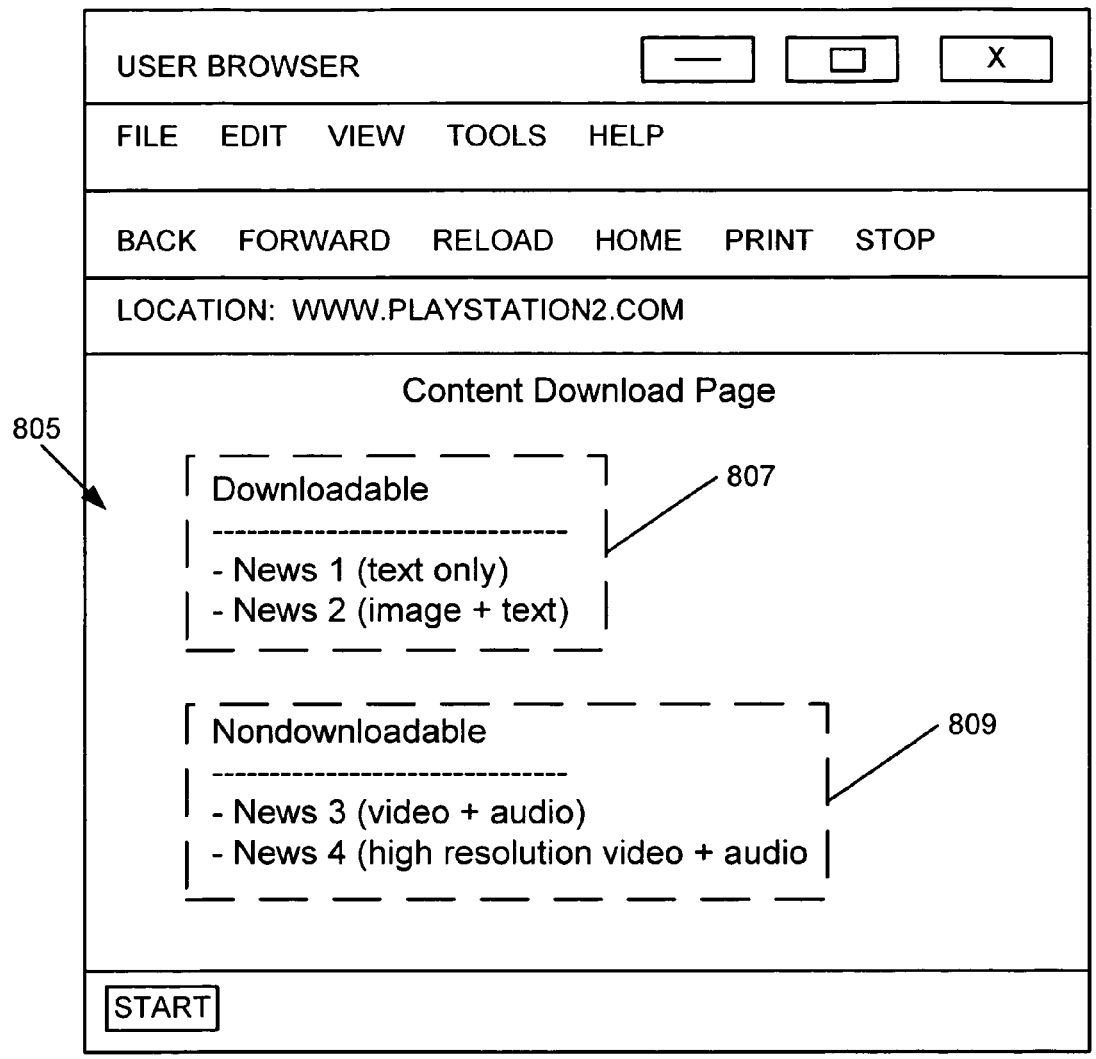
FIG. 8 is an illustration of a display screen produced at a client node of the computer network, showing a Web page for selecting and downloading content from the content provider node.

The content download list can be presented to the user in the form of a Web page that the service manager device 115 generates and transfers to the user device 110. FIG. 8 shows an exemplary content download Web page 805 within a browser window that is displayed on a display screen of the user device 110. The Web page 805 includes a downloadable list 807 of content for which the user device 110 can attain the requisite service level for downloading. Thus, the user device can actually download the content included in the list

807. The Web page 790 can also include a nondownloadable list 809 of content for which the user device cannot attain the requisite service level for downloading. The user device 110 cannot actually download the content from the list 809. The lists 807, 809 of content preferably include a brief description regarding the characteristics of the content so that the user can gain an idea of what type of content is available.

With reference again to FIG. 7, in the next operation, represented by the flow diagram box numbered 740, the user selects at least one item of content from the list 807 or the list 809. The items in the lists 807, 809 preferably comprise links that cause the service manager device 115 to execute certain processes when the items are selected by the user.

When the user selects an item from the list 807 or 809, the process proceeds to the operation represented by the decision box numbered 750, where the service manager device 115 determines whether the user selected downloadable content or nondownloadable content. If the user selected downloadable content (a "Yes" outcome), then the process proceeds to the operation represented by the flow diagram box numbered 760, where the service manager device 115 initiates a transfer of the selected content to the user device 110.

However, if the user selected a nondownloadable content (a "No" outcome from the decision box numbered 750), then the process proceeds to the operation represented by the flow diagram box numbered 765. In this operation, the service manager device 115 determines how the configuration of the user device 110 can be changed or upgraded to render the selected content downloadable. The service management software 155 preferably compares the communication environment and hardware configuration data with the minimum requirements for downloading the selected content and then determines what changes to the user device configuration would be necessary to make the requisite service level available to the user device 110.

In the next operation, represented by the flow diagram box numbered 770, the service manager device 115 transmits a message for display on the user device 110 that includes information on possible upgrades or changes to the user device 110. The message could take on a variety of formats, such as a pop-up window or a separate Web page. The message preferably also includes one or more links that permit the user to obtain services or goods to realize the upgrade or to obtain information regarding such upgrades.

Figure 9:
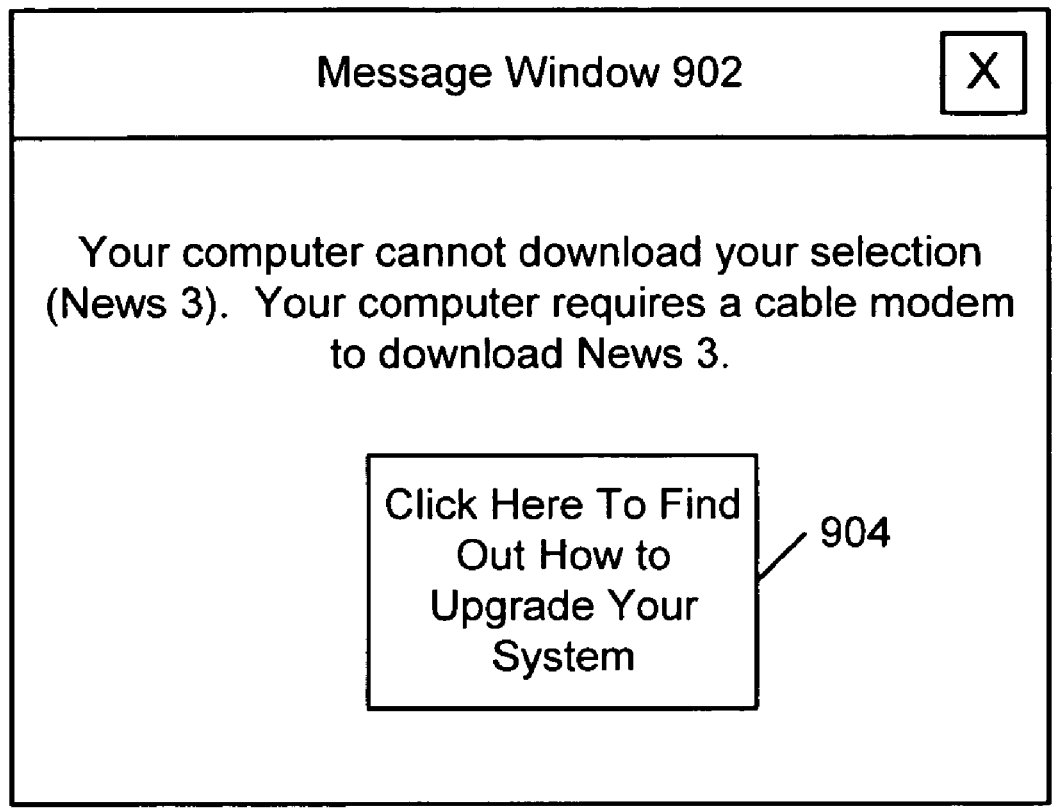
FIG. 9 is an illustration of a display screen produced at a client node of the computer network, showing a message window that contains information regarding possible upgrades to a user node device.

FIG. 9 shows an exemplary message window 902 that informs the user that the selected content (e.g., News 3) cannot be downloaded and that a cable modem is required to download the selected content. The message window 902 includes at least one link 904 that, when selected, causes the service manager device 115 to contact service or product vendors on behalf of the user regarding provision of the upgrades. The link 904 could also lead to information regarding the upgrades. The user can thereby use the link 904 to obtain the upgrades or to obtain additional information on the upgrades.

In the next operation, the service manager device 115 administers any royalties that result from the user obtaining any of the recommended upgrades, as represented by the flow diagram box numbered 780. The royalties can include monetary payments to a party that runs the service manager device 115 from a party that provided the upgrade to the user device 110. Administration of the royalties can include the determination of royalty amounts, the determination of which parties should receive the royalties, as well as the initiation of royalty transfer between the appropriate parties. The process then ends.

Figure 10:
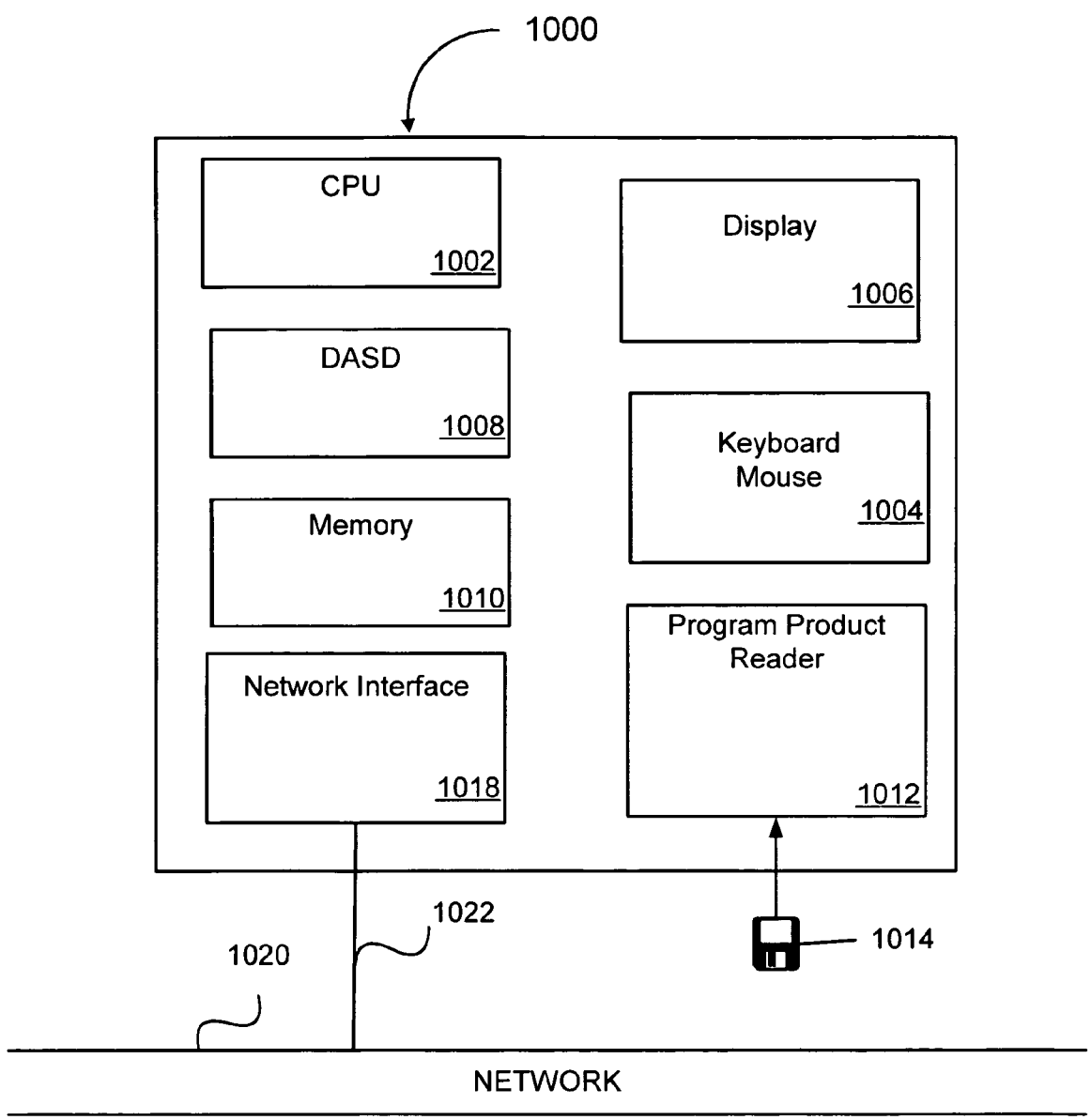
FIG. 10 is a block diagram of a computer in the network illustrated in FIG. 1, illustrating the hardware components.

As noted above, the user device 110, service manager device 115, and content provider device 120 shown in the block diagram of FIG. 1 comprise nodes of a computer network system 100. FIG. 10 is a block diagram of a computer in the system 100 of FIG. 1, illustrating the hardware components included in one of the computers. Those skilled in the art will appreciate that the devices 110, 115, and 120 may all have a similar computer construction, or may have alternative constructions consistent with the capabilities described herein.

FIG. 10 shows an exemplary computer 1000 such as might comprise any of the devices 110, 115, or 120. Each computer 1000 operates under control of a central processor unit (CPU) 1002, such as a "Pentium" microprocessor and associated integrated circuit chips, available from Intel Corporation of Santa Clara, Calif., U.S.A. A computer user can input commands and data from a keyboard and computer mouse 1004, and can view inputs and computer output at a display 1006. The display is typically a video monitor or flat panel display. The computer 1000 also includes a direct access storage device (DASD) 1008, such as a hard disk drive. The memory 1010 typically comprises volatile semiconductor random access memory (RAM). Each computer preferably includes a program product reader 1012 that accepts a program product storage device 1014, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc. Each computer 1000 can communicate with the others over a computer network 1020 (such as the Internet or an intranet) through a network interface 1018 that enables communication over a connection 1022 between the network 1020 and the computer. The network interface 1018 typically comprises, for example, a Network Interface Card (NIC) or a modem that permits communications over a variety of networks.

The CPU 1002 operates under control of programming steps that are temporarily stored in the memory 1010 of the computer 1000. When the programming steps are executed, the computer performs its functions. Thus, the programming steps implement the functionality of any of the management software 145, 155, and 170 illustrated in FIG. 1. The programming steps can be received from the DASD 1008, through the program product storage device 1014, or through the network connection 1022. The program product storage drive 1012 can receive a program product 1014, read programming steps recorded thereon, and transfer the programming steps into the memory 1010 for execution by the CPU 1002. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 1010 over the network 1020. In the network method, the computer receives data including program steps into the memory 1010 through the network interface 1018 after network communication has been established over the network connection 1022 by well-known methods that will be understood by those skilled in the art without further explanation. The program steps are then executed by the CPU 1002 thereby comprising a computer process.

It should be understood that all of the devices 110, 115, 120 of the network system 100 illustrated in FIG. 1 typically have a construction similar to that shown in FIG. 10, so that details described with respect to the FIG. 10 computer 1000 will be understood to apply to all computers of the system 100. Alternatively, any of the devices 110, 115, 120 can have an alternative construction, so long as the computer can communicate with the other computers illustrated in FIG. 1 and can support the functionality described herein.

Figure 11:
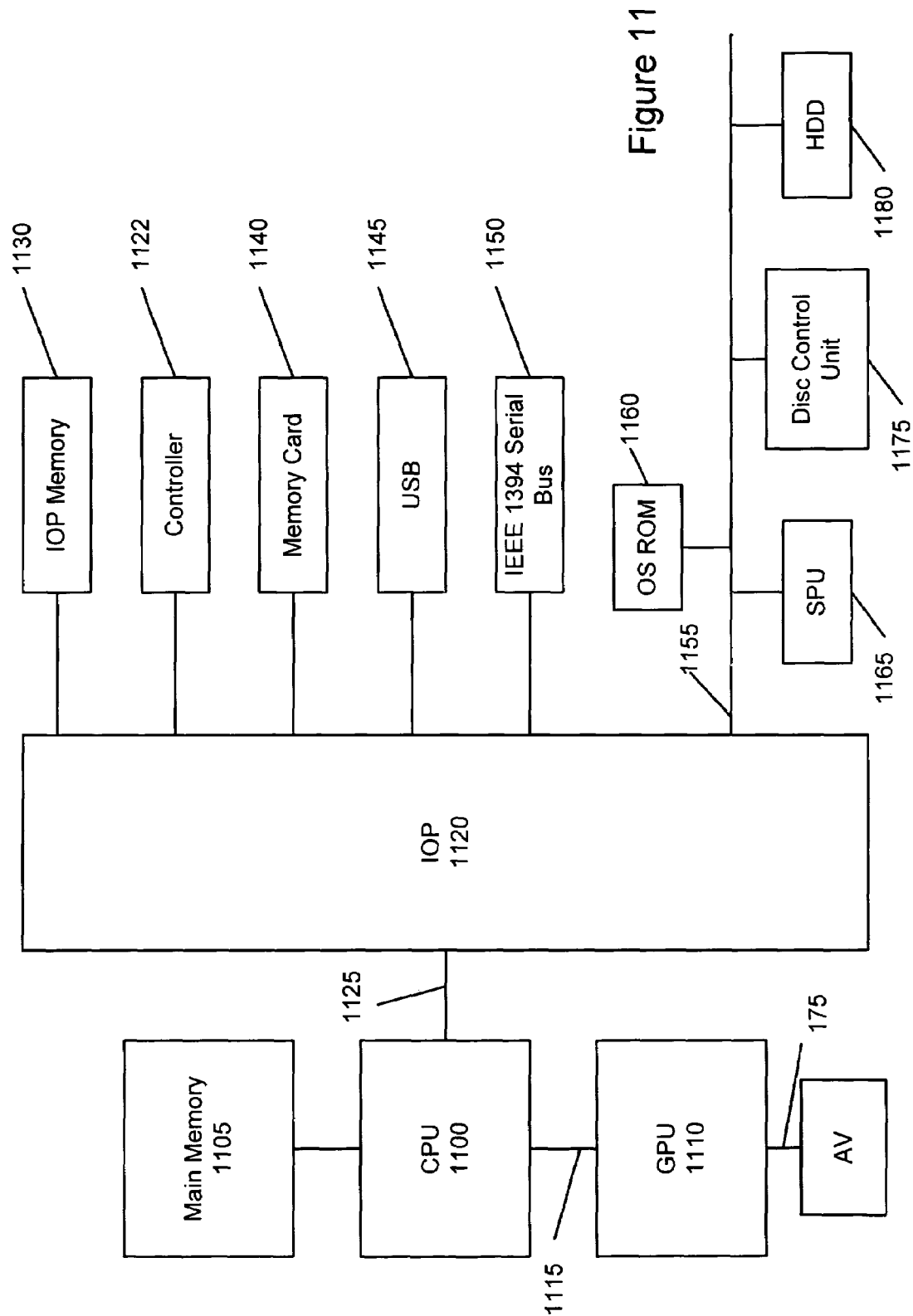
FIG. 11 is a block diagram of a computer entertainment system in the network illustrated in FIG. 1, illustrating the hardware components.

For example, with reference to FIG. 11, the user device 110 can comprise a computer entertainment system, such as a video game system 1100. FIG. 11 is a block diagram of an exemplary hardware configuration of the system.

The video game system 1100 includes a central processing unit (CPU) 1100 that is associated with a main memory 1105. The CPU 1100 operates under control of programming steps that are stored in the OS-ROM 1160 or transferred from a game program storage medium to the main memory 1105. The CPU 1100 is configured to process information and execute instructions in accordance with the programming steps.

The CPU 1100 is communicatively coupled to an input/output processor (IOP) 1120 via a dedicated bus 1125. The IOP 1120 couples the CPU 1100 to an OS ROM 1160 comprised of a non-volatile memory that stores program instructions, such as an operating system. The instructions are preferably transferred to the CPU via the IOP 1120 at start-up of the main unit 110.

The CPU 1100 is communicatively coupled to a graphics processing unit (GPU) 1110 via a dedicated bus 1115. The GPU 1110 is a drawing processor that is configured to perform drawing processes and formulate images in accordance with instructions received from the CPU 1100. For example, the GPU 1110 may render a graphics image based on display lists that are generated by and received from the CPU 1100. The GPU may include a buffer for storing graphics data. The GPU 1110 outputs images to an audio-visual output device.

The IOP 1120 controls the exchange of data among the CPU 1100 and a plurality of peripheral components in accordance with instructions that are stored in an IOP memory 1130. The peripheral components may include one or more input controllers 1122, a memory card 1140, a USB 1145, and an IEEE 1394 serial bus 1150. Additionally, a bus 1155 is communicatively coupled to the IOP 1120. The bus 1155 is linked to several additional components, including the OS ROM 1160, a sound processor unit (SPU) 1165, an optical disc control unit 1175, and a hard disk drive (HDD) 1180.

The SPU 1165 is configured to generate sounds, such as music, sound effects, and voices, in accordance with commands received from the CPU 1100 and the IOP 1120. The SPU 1165 may include a sound buffer in which waveform data is stored. The SPU 1165 generates sound signals and transmits the signals to speakers.

The disc control unit 1175 is configured to control a program reader, which can comprise, for example, an optical disk drive that accepts removable storage media such as a magnetic floppy disk, an optical CD-ROM disc, a CD-R disc, a CD-RW disc, a DVD disk, or the like.

The memory card 1140 may comprise a storage medium to which the CPU 1100 may write and store data. Preferably, the memory card 1140 can be inserted and removed from the IOP 1120. A user can store or save data using the memory card 1140. In addition, the video game system 1100 is preferably provided with at least one hard disk drive (HDD) 1180 to which data may be written and stored.

A data I/O interface, such as an IEEE 1394 serial bus 1150 or a universal serial bus (USB) 1145 interface, is preferably communicatively coupled to the IOP 1120 in order to allow data to be transferred into and out of the video game system 1100, such as to the network 135 of FIG. 1.

The present invention has been described above in terms of a presently preferred embodiment so that an understanding of the present invention can be conveyed. There are, however, many configurations for the system not specifically described herein but with which the present invention is applicable. The present invention should therefore not be seen as limited to the particular embodiment described herein, but rather, it should be understood that the present invention has wide applicability with respect to search query systems generally. All modifications, variations, or equivalent arrangements and implementations that are within the scope of the attached claims should therefore be considered within the scope of the invention.

We claim:

1. A method of managing the transfer of content to a user device that is communicatively linked to a computer network, comprising:
    obtaining user device information descriptive of a configuration of the user device;
    determining capabilities of the user device to download content over the network and to process content received over the network based upon the user device information;
    automatically selecting a service level that is selected from among a plurality of predefined service levels that set combinations of transfer parameters and is determined to be available to the user device for transferring content thereto based upon whether the determined capabilities of the user device meet minimum requirements for one of the predefined service levels, wherein the selected service level is associated with one or more characteristics of content for transfer to the user device;
    determining whether an upgrade could make any additional of the plurality of predefined service levels available to the user device;
    transmitting a message to the user device that causes a notice having an advertisement link to be displayed on the user device, wherein the advertisement link is for a provider that could assist in making changes to a configuration of the user device in order to upgrade the capabilities of the user device; and
    monitoring selections of the advertisement link;
    wherein the advertisement link may effect a receipt of compensation.

2. A method as defined in claim 1, additionally comprising:
    receiving a request to transfer content to the user device over the computer network; and
    causing content to be transferred to the user device over the network according to the selected service level.

3. A method as defined in claim 1, wherein a service level is also associated with one or more characteristics of the manner in which content is transferred to the user device over the network.

4. A method as defined in claim 3, wherein the manner in which the content is transferred to the user device comprises streaming the content to the user device.

5. A method as defined in claim 1, additionally comprising:

identifying a list of content that can be transferred to the user device based upon the determined capabilities of the user device;

causing the list of content to be displayed at the user device.

6. A method as defined in claim 1, wherein the user device information includes the amount of data that can be transmitted to the user device in a given amount of time over the network.

7. A method as defined in claim 1, wherein the user device information includes the latency of the user device with respect to a content provider device on the computer network.

8. A method as defined in claim 1, wherein the user device information includes the amount of data storage capacity available to the user device.

9. A method as defined in claim 1, wherein the one or more characteristics of content associated with a service level includes the size of the content.

10. A method as defined in claim 1, wherein the one or more characteristics of content includes whether the content includes graphic files.

11. A method as defined in claim 1, wherein the one or more characteristics of content includes whether the content is an executable file.

12. A method as defined in claim 1, wherein a first service level has a corresponding minimum capabilities requirement, and further comprising selecting a first service level for the user device only if the capabilities of the user device meet the minimum capabilities requirements.

13. A method as defined in claim 1, wherein selecting a service level is performed at a network service manager device independent of a network provider from which the content is transferred.

14. A method of managing the transfer of content to a user device that is communicatively linked to a computer network, comprising:

obtaining user device information descriptive of a configuration of the user device;

identifying one or more service levels that may govern the transfer of content to the user device, wherein each service level is associated with one or more characteristics of content available for transfer to the user device and the manner in which content is transferred to the user device over the network, each service level being further associated with minimum requirements relating to the configuration of the user device and setting combinations of transfer parameters;

making available at least one of the service levels to the user device for governing the transfer of content to the user device; and automatically selecting one of the identified service levels to govern the transfer of content to the user device based upon the user device information and whether the configuration of the user device meets minimum requirements for a service level;

wherein selecting a service level is performed at a network service manager device independent of a network provider from which the content is transferred, and wherein the identified service levels comprise a plurality of predefined service levels that include, a first predefined service level that makes text files available, a second predefined service level that makes text files and video game software applications available, a third predefined service level that makes text files, video game software applications, video streaming, and CD quality sound files available, and a fourth predefined service level that makes text files, video game software applications, video streaming, CD quality sound files, and higher resolution video streaming available.

15. A method as defined in claim 14, further comprising:

receiving a request to transfer content to the user device over the computer network;

causing content to be transmitted to the user device according to the selected service level.

16. A method as defined in claim 14, additionally comprising:

making a service level available to the user device only if the configuration of the user device meets the minimum requirements for the service level.

17. A method as defined in claim 14, wherein at least one of the service levels is made unavailable to the user device because the configuration of the user device does not meet the requirements of the service level.

18. A method as defined in claim 17 additionally comprising providing information to the user device regarding the unavailable service level.

19. A method as defined in claim 18, additionally comprising notifying the user device of changes that may be made to the configuration of the user device in order to meet the minimum requirements of the unavailable service level.

20. A method as defined in claim 19, additionally comprising sending one or more advertisements to the user device regarding changes that may be made to the configuration of the user device.

21. A method as defined in claim 14, wherein the user device information includes the amount of data that can be transmitted to the user device in a given amount of time over the network.

22. A method as defined in claim 14, wherein the user device information includes the latency of the user device with respect to a content provider device on the computer network.

23. A method as defined in claim 14, wherein the user device information includes the amount of data storage capacity available to the user device.

24. A method as defined in claim 14, wherein the one or more characteristics of content includes the size of the content.

25. A method as defined in claim 14, wherein the one or more characteristics of content includes whether the content comprises graphic files.

26. A method as defined in claim 14, wherein the one or more characteristics of content includes whether the content is an executable file.

27. A method as defined in claim 14, wherein the manner in which the content is transferred to the user device comprises streaming the content to the user device.

28. A program product including a recording medium that stores a program readable and executable by an information processing system to cause the information processing system to perform processing that manages the transfer of content to a user device that is communicatively linked to a computer network, the program including instructions for causing the information processing system to execute:

a first process comprising obtaining user device information descriptive of a configuration of the user device;

a second process comprising, determining capabilities of the user device to download content over the network and to process content received over the network based upon the user device information;
a third process comprising, automatically selecting a service level that is selected from among a plurality of predefined service levels that set combinations of transfer parameters and is determined to be available to the user device for transferring content thereto based upon whether the determined capabilities of the user device meet minimum requirements for a predefined service level, wherein the selected service level is associated with one or more characteristics of content for transfer to the user device; and
a fourth process comprising, determining whether an upgrade could make any additional of the plurality of predefined service levels available to the user device;
a fifth process comprising, transmitting a message to the user device that causes a notice having an advertisement link to be displayed on the user device, wherein the advertisement link is for a provider that could assist in making changes to a configuration of the user device in order to upgrade the capabilities of the user device; and
a sixth process comprising, monitoring selections of the advertisement link;
wherein the advertisement link may effect a receipt of compensation.

29. The program product of claim 28, the program further including instructions for causing the information processing system to execute a processes comprising:
receiving a request to transfer content to the user device over the computer network;
causing content to be transferred to the user device over the network according to the selected service level.

30. The program product of claim 28, wherein a service level is also associated with one or more characteristics of the manner in which content is transferred to the user device over the network.

31. The program product of claim 30, wherein the manner in which the content is transferred to the user device comprises streaming the content to the user device.

32. The program product of claim 28, wherein the user device information includes the amount of data that can be transmitted to the user device in a given amount of time over the network.

33. The program product of claim 28 wherein the user device information includes the latency of the user device with respect to a content provider device on the computer network.

34. The program product of claim 28, wherein the user device information includes the amount of data storage capacity available to the user device.

35. The program product of claim 28, wherein the one or more characteristics of content associated with a service level includes the size of the content.

36. The program product of claim 28, wherein the one or more characteristics of content includes whether the content includes graphic files.

37. The program product of claim 28, wherein the one or more characteristics of content includes whether the content is an executable file.

38. The program product of claim 28, wherein a first service level has a corresponding minimum capabilities requirement, and wherein the program further includes instructions for causing the information processing system to execute a process comprising selecting a first service level for the user device only if the capabilities of the user device meet the minimum capabilities requirements.

39. A program product as defined in claim 28, wherein the third process of selecting a service level is performed at a network service manager device independent of a network provider from which the content is transferred.

40. A program product that includes a recording medium that stores a program readable and executable by an information processing system to cause the information processing system to manage the transfer of content to a user device that is communicatively linked to a computer network, the program including instructions for causing the information processing system to execute:
a first process comprising obtaining user device information descriptive of a configuration of the user device;
a second process comprising identifying one or more service levels that may govern the transfer of content to the user device, wherein each service level is associated with one or more characteristics of content available for transfer to the user device and the manner in which content is transferred to the user device over the network, each service level being further associated with minimum requirements relating to the configuration of the user device and setting combinations of transfer parameters;
a third process comprising making available at least one of the service levels to the user device for governing the transfer of content to the user device; and
a fourth process comprising automatically selecting one of the identified service levels to govern the transfer of content to the user device based upon the user device information and whether the configuration of the user device meets minimum requirements for a service level;
wherein the fourth process of selecting a service level is performed at a network service manager device independent of a network provider from which the content is transferred, and
wherein the identified service levels comprise a plurality of predefined service levels that include,
a first predefined service level that makes text files available,
a second predefined service level that makes text files and video game software applications available,
a third predefined service level that makes text files, video game software applications, video streaming, and CD quality sound files available, and
a fourth predefined service level that makes text files, video game software applications, video streaming, CD quality sound files, and higher resolution video streaming available.

41. The program product of claim 40, the program further including instructions for causing the information processing system to execute a process comprising:
receiving a request to transfer content to the user device over the computer network;
causing content to be transmitted to the user device according to the selected service level.

42. The program product of claim 40, the program further including instructions for causing the information processing system to execute a process comprising:
making a service level available to the user device only if the configuration of the user device meets the minimum requirements for the service level.

43. The program product of claim 40, wherein at least one of the service levels is made unavailable to the user device because the configuration of the user device does not meet the requirements of the service level.

44. The program product of claim 43, the program further including instructions for causing the information processing system to execute a process comprising providing information to the user device regarding the unavailable service level.

45. The program product of claim 44, the program further including instructions for causing the information processing system to execute a process comprising notifying the user device of changes that may be made to the configuration of the user device in order to meet the minimum requirements of the unavailable service level.

46. The program product of claim 45, the program further including instructions for causing the information processing system to execute a process comprising sending one or more advertisements to the user device regarding changes that may be made to the configuration of the user device.

47. The program product of claim 40, wherein the user device information includes the amount of data that can be transmitted to the user device in a given amount of time over the network.

48. The program product of claim 40, wherein the user device information includes the latency of the user device with respect to a content provider device on the computer network.

49. The program product of claim 40, wherein the user device information includes the amount of data storage capacity available to the user device.

50. The program product of claim 40, wherein the one or more characteristics of content includes the size of the content.

51. The program product of claim 40, wherein the one or more characteristics of content includes whether the content comprises graphic files.

52. The program product of claim 40, wherein the one or more characteristics of content includes whether the content is an executable file.

53. The program product of claim 40, wherein the manner in which the content is transferred to the user device comprises streaming the content to the user device.

54. An information processing system comprised of one or more information processors configured to execute program instructions that cause the information processing system to implement one or more processes for managing the transfer of content to a user device that is communicatively linked to a computer network, the processes comprising:
  a first process comprising obtaining user device information descriptive of a configuration of the user device;
  a second process comprising, determining capabilities of the user device to download content over the network and to process content received over the network based upon the user device information;
  a third process comprising automatically selecting a service level that is selected from among a plurality of predefined service levels that set combinations of transfer parameters and is determined to be available to the user device for transferring content thereto based upon whether the determined capabilities of the user device meet minimum requirements for a predefined service level, wherein the selected service level is associated with one or more characteristics of content for transfer to the user device; and
  a fourth process comprising, determining whether an upgrade could make any additional of the plurality of predefined service levels available to the user device;
  a fifth process comprising, transmitting a message to the user device that causes a notice having an advertisement link to be displayed on the user device, wherein the advertisement link is for a provider that could assist in making changes to a configuration of the user device in order to upgrade the capabilities of the user device; and
  a sixth process comprising, monitoring selections of the advertisement link;
  wherein the advertisement link may effect a receipt of compensation.

55. The information processing system of claim 54, wherein the processes further include processes comprised of:
  receiving a request to transfer content to the user device over the computer network; and
  transferring content to the user device over the network according to the selected service level.

56. The information processing system of claim 54, wherein a service level is associated with one or more characteristics of the manner in which content is transferred to the user device over the network.

57. The information processing system of claim 56, wherein the manner in which the content is transferred to the user device comprises streaming the content to the user device.

58. The information processing system of claim 54, wherein the user device information includes the amount of data that can be transmitted to the user device in a given amount of time over the network.

59. The information processing system of claim 54, wherein the user device information includes the latency of the user device with respect to a content provider device on the computer network.

60. The information processing system of claim 54, wherein the user device information includes the amount of data storage capacity available to the user device.

61. The information processing system of claim 54, wherein the one or more characteristics of content associated with a service level includes the size of the content.

62. The information processing system of claim 54, wherein the one or more characteristics of content includes whether the content includes graphic files.

63. The information processing system of claim 54, wherein the one or more characteristics of content includes whether the content is an executable file.

64. The information processing system of claim 54, wherein a first service level has a corresponding minimum capabilities requirement, and wherein the processes further include a process comprised of selecting a first service level for the user device only if the capabilities of the user device meet the minimum capabilities requirements.

65. The information processing system of claim 54, wherein the third process of selecting a service level is performed at a network service manager device independent of a network provider from which the content is transferred.

66. An information processing system comprised of one or more information processors configured to execute program instructions that cause the information processing system to implement one or more processes for managing the transfer of content to a user device that is communicatively linked to a computer network, the processes comprising:
  a first process comprising obtaining user device information descriptive of a configuration of the user device;
  a second process comprising identifying one or more service levels that may govern the transfer of content to the user device, wherein each service level is associated with one or more characteristics of content available for transfer to the user device and the manner in which content is transferred to the user device over the network, each service level being further associated with minimum requirements relating to the configuration of the user device and setting combinations of transfer parameters;

a third process comprising making available at least one of the service levels to the user device for governing the transfer of content to the user device; and a fourth process comprising, automatically selecting one of the identified service levels to govern the transfer of content to the user device based upon the user device information and whether the configuration of the user device meets minimum requirements for a service level;

wherein the fourth process of selecting a service level is performed at a network service manager device independent of a network provider from which the content is transferred, and wherein the identified service levels comprise a plurality of predefined service levels that include,
- a first predefined service level that makes text files available,
- a second predefined service level that makes text files and video game software applications available,
- a third predefined service level that makes text files, video game software applications, video streaming, and CD quality sound files available, and
- a fourth predefined service level that makes text files, video game software applications, video streaming, CD quality sound files, and higher resolution video streaming available.

67. The information processing system of claim 66, wherein the processes further include a process comprised of:
receiving a request to transfer content to the user device over the computer network;
causing content to be transmitted to the user device according to the selected service level.

68. The information processing system of claim 66, wherein the processes further include a process comprised:
making a service level available to the user device only if the configuration of the user device meets the minimum requirements for the service level.

69. The information processing system of claim 66, wherein at least one of the service levels is made unavailable to the user device because the configuration of the user device does not meet the requirements of the service level.

70. The information processing system of claim 69, wherein the processes further include a process comprised of providing information to the user device regarding the unavailable service level.

71. The information processing system of claim 70, wherein the processes further include a process comprised of notifying the user device of changes that may be made to the configuration of the user device in order to meet the minimum requirements of the unavailable service level.

72. The information processing system of claim 71, wherein the processes further include a process comprised of sending one or more advertisements to the user device regarding changes that may be made to the configuration of the user device.

73. The information processing system of claim 66, wherein the user device information includes the amount of data that can be transmitted to the user device in a given amount of time over the network.

74. The information processing system of claim 66, wherein the user device information includes the latency of the user device with respect to a content provider device on the computer network.

75. The information processing system of claim 66, wherein the user device information includes the amount of data storage capacity available to the user device.

76. The information processing system of claim 66, wherein the one or more characteristics of content includes the size of the content.

77. The information processing system of claim 66, wherein the one or more characteristics of content includes whether the content comprises graphic files.

78. The information processing system of claim 66, wherein the one or more characteristics of content includes whether the content is an executable file.

79. The information processing system of claim 66, wherein the manner in which the content is transferred to the user device comprises streaming the content to the user device.

* * * * *